United States Patent [19]

Louthan

[11] Patent Number: 4,922,648
[45] Date of Patent: May 8, 1990

[54] FISHING DIVER

[76] Inventor: Clissolde L. Louthan, 9024 NE. Oregon, Portland, Oreg. 97220

[21] Appl. No.: 312,290

[22] Filed: Feb. 21, 1989

[51] Int. Cl.⁵ .......................................... A01K 95/00
[52] U.S. Cl. ................................................... 43/43.13
[58] Field of Search .................. 43/43.1, 43.12, 43.13, 43/27.4, 42.49

[56] References Cited

U.S. PATENT DOCUMENTS

| | | | |
|---|---|---|---|
| 1,749,464 | 3/1930 | Bond | 43/43.13 |
| 2,247,583 | 7/1941 | Louthan | 43/43.13 |
| 2,273,209 | 2/1942 | Louthan | 43/43.13 |
| 2,566,029 | 8/1951 | Louthan | 43/43.13 |
| 2,716,832 | 9/1955 | Minnie | 43/43.13 |
| 2,942,371 | 6/1960 | Johnson | 43/43.13 |
| 3,140,555 | 7/1964 | Gross | 43/43.13 |
| 3,570,167 | 3/1971 | Smith | 43/43.13 |
| 3,583,089 | 6/1971 | Scarbro | 43/43.13 |
| 3,613,290 | 10/1971 | Louthan | 43/43.13 |
| 3,643,370 | 2/1972 | Cook et al. | 43/43.13 |
| 3,708,904 | 1/1973 | Zaharis | 43/43.13 |
| 3,835,573 | 9/1974 | Borchardt | 43/43.13 |
| 3,844,059 | 10/1974 | Weber | 43/43.13 |
| 3,940,872 | 3/1976 | Webber | 43/43.13 |
| 3,978,811 | 9/1976 | Angus | 43/43.13 |
| 4,538,374 | 9/1985 | Louthan | 43/44.96 |
| 4,567,687 | 2/1986 | Even et al. | 43/43.13 |

Primary Examiner—Kurt Rowan
Attorney, Agent, or Firm—Eugene M. Eckelman

[57] ABSTRACT

A diver body portion has a flexible link with a pole line connected between the ends thereof. The flexible link is connected to the top surface of the body adjacent the forward and rearward ends, a rearward connection comprising a pair of connecting points for diverging portions of the flexible link to stabilize the rearward portion of the diver when it is subjected to water current. The body portion is buoyant, with the principal buoyant portion being at the rearward end whereby the diver will rise to the surface with the rearward end pointed upwardly when there is no tension on the fish line. The front connection for the flexible link comprises a rearwardly facing flexible link that is releasable by a force being applied in a direction opposite from the fish line, such as when a fish strikes the bait line, such releasing action neutralizing diving effects of the diver. A weight is slidably mounted on a longitudinal rod at the bottom of the body portion and assists in diving and retrieving actions. The body portion has a wedge shape as viewed from the side and also has side wing portions intermediate the forward and rearward ends contributing to a stabilized movement in the water.

8 Claims, 1 Drawing Sheet

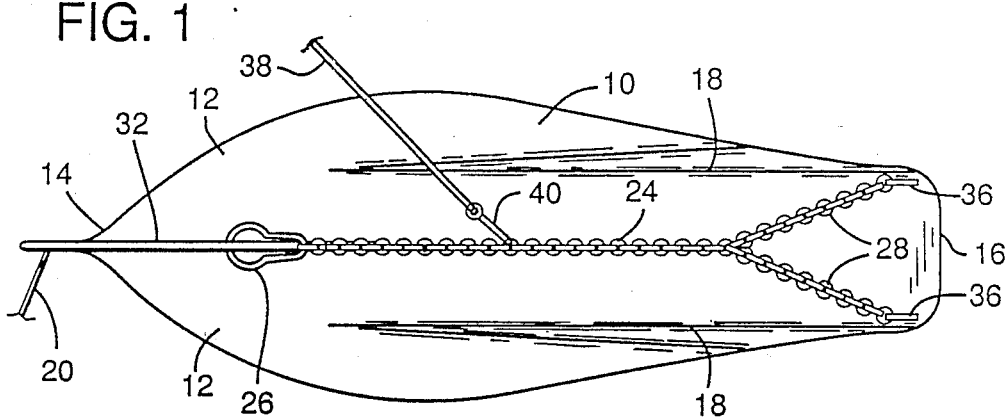
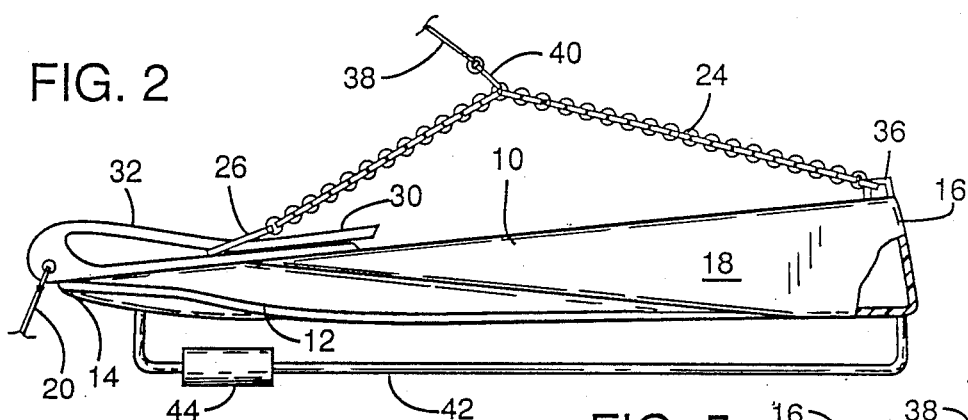
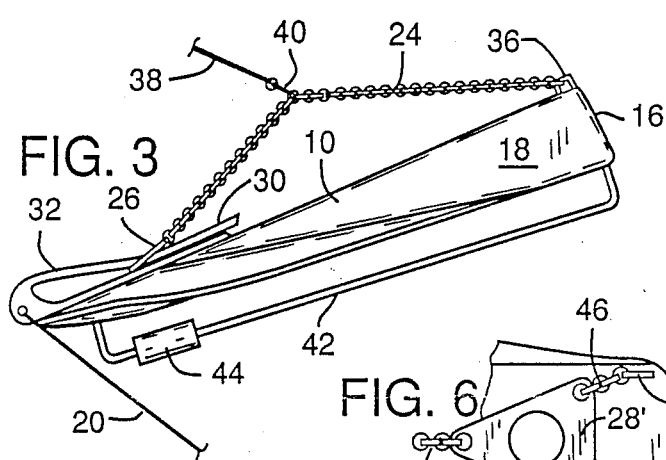
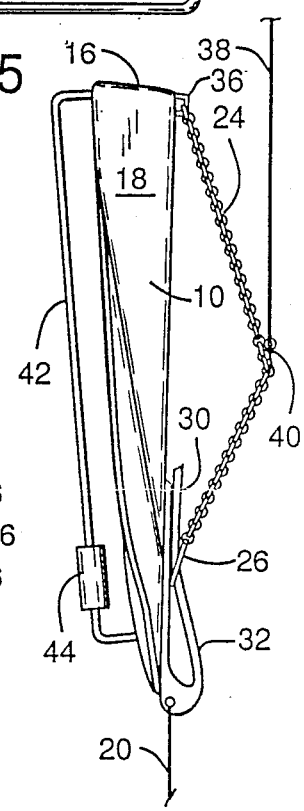
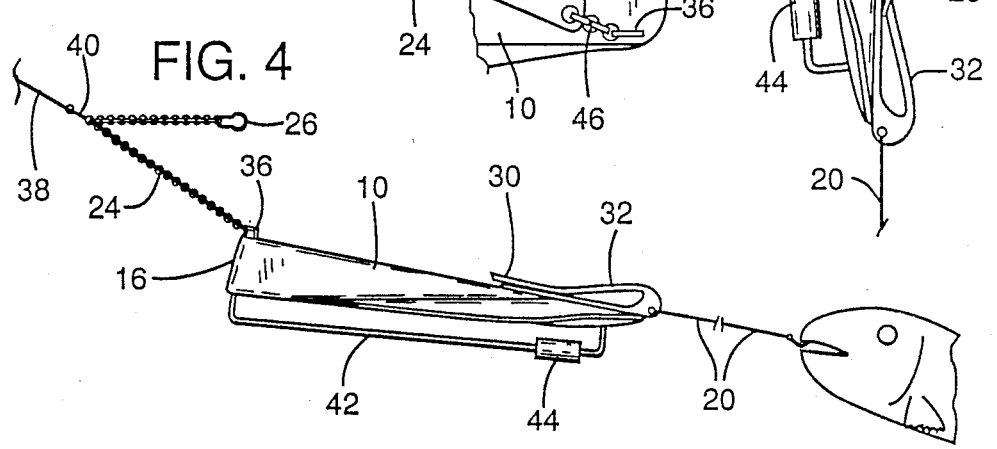

FISHING DIVER

BACKGROUND OF THE INVENTION

This invention relates to new and useful improvements in fishing divers arranged to be used in lieu of lead sinkers for submerging a bait line in water to a desired depth.

Various types of fishing divers have heretofore been provided for the purpose of submerging a bait for trolling. One such device is shown in applicant's prior U.S. Pat. No. 3,613,290 wherein a buoyant body portion is connected to a pole line in a manner that causes the body portion to dive. The amount of dive is also determined by the speed of troll. Applicant's prior patent also includes structure that releases the diver from the pole line in an arrangement such that when a fish strikes, the diver floats up the pole line to the surface.

Other devices have also been employed that neutralize the effects of the diver when a fish strikes so that the diver will not resist efforts in landing the fish. Such devices are shown in U.S. Pat. Nos. 3,583,089, 3,844,059, 3,940,872, and 4,567,687.

SUMMARY OF THE INVENTION

According to the present invention and forming a primary objective thereof, a fishing diver is provided that has improved features of providing controlled diving movement and also improved features of neutralizing the effects of the diver when a fish strikes or when it is desired to retrieve the diver.

In carrying out such objectives, the body portion of the diver has flexible link means secured thereto which is arranged for attachment to a pole line at selected dive positions thereof. Fish line connecting means are provided at the forward end of the body portion. The second connector means includes a pair of connecting points adjacent opposite sides. The flexible link means provides a diving function when the diver is subjected to a water current that applies tension to a fish line connected to the fish line connecting means. Such flexible link means includes a single link portion attached at the forward end thereof to first connector means and diverging portions secured at the rearward end thereof to second connector means. The diverging portions stabilize the rearward portion of the diver when the latter is subjected to water current. The first connector means comprises a friction connection arranged to release the flexible link means when a force is exerted on the forward end of the body portion in a direction opposite from the tension force of the fish line, such as when a fish strikes. The body portion is buoyant and will rise to the surface when it is not subjected to water current and is arranged, with the assistance of a shifting weight, to rise with the rearward end thereof pointed upwardly and also in such position to allow the pole line to be released from the first connection means by a quick jerk. The body is wedge-shaped as viewed from the side with the reduced end being disposed toward the front, and also the body portion has a pointed front end and wing portions intermediate the forward and rearward ends and leading to a narrowed tapering rearward end for providing diving efficiency in the water.

The invention will be better understood and additional objects and advantages will become apparent from the following description taken in connection with the accompanying drawings.

BRIEF DESCRIPTION OF THE DRAWINGS

FIG. 1 is a top plan view of the fishing diver embodying features of the present invention.

FIG. 2 is a side elevational view thereof.

FIG. 3 is a diagrammatic side elevational view of the diver in operative diver position.

FIG. 4 is a diagrammatic side elevational view showing the position of the diver after having been released from dividing condition by the strike of a fish.

FIG. 5 is a diagrammatic side elevational view of the diver in a position at which it will automatically assume for retrieving it to the surface, and FIG. 6 is a fragmentary top plan view showing an alternative from of rear connecting means for the flexible link means.

DETAILED DESCRIPTION OF PREFERRED EMBODIMENTS

With particular reference to the drawings, and first to FIGS. 1 and 2, the present diver comprises a body portion 10 of substantially uniform width and having side wing extensions 12 which extend to a tapered front end 14. The wing extensions 12 taper rearwardly to a narrower width flush with the sides of the body portion 10. In side elevation, the body portion assumes a wedge-shaped configuration, with the thickened end 16 being disposed toward the rear. The body portion 10 is hollow or otherwise made buoyant, the great buoyancy being toward the rear so that in a normal rest position in the water, the rearward end will point upwardly, such as shown in the diagrammatic view of FIG. 5, The side walls 18 of the body portion provide stabilizing surfaces against water current to which the diver may be subjected.

A fish line 20, namely, the line running to the bait or lure, is connected to the front end of the body portion 10.

The present diver is controlled by a flexible link 24 terminating at its forward end in a ring 26 and at its rearward end in diverging portions 28. The ring member 26 is arranged to be slidably engaged under a spring finger 30 forming a part of a loop integral with the forward end of the diver and biased against an upper surface of the body portion 10. Ring member 26 is arranged to be manually inserted into the loop at the free end of the finger 30 and is also arranged by means of a selective pull on the flexible link to slide rearwardly under the finger and release therefrom. The diverging ends 28 of the flexible link 24 are fixedly secured to spaced apart connectors 36 adjacent opposite sides of the body portion 10. A pole line 38 is attached to the flexible link 24 by a connector 40. Flexible link 24 preferably comprises a link-type member and connector 40 is releasable therefrom whereby such connector can be attached selected positions to control diving functions as will be more apparent hereinafter.

A rod 42 depends from the bottom of the diver and extends longitudinally thereof approximately from the forward to rearward ends. This rod supports a lead weight 44 in a freely slidable relation.

OPERATION

To initiate a diving function, the ring member 26 is inserted in the loop 32 as shown in FIG. 2 by forcing it under finger 30 and the connector 40 attached to the flexible link 24. Attachment of the connector 40 to the flexible link is predetermined depending upon the angle of dive desired. That is, the farther the connection is to the rear of the diver, the steeper will be the dive. In initiating a diving function, the weight 44 is manually slid to the front. The device is then inserted in the water, and as water current works against the pole line an angle of dive, such as shown in FIG. 3, is formed and the device will descend. The weight 44 will remain at the front in view of the angle of dive and assist in the dive. It is protected from the water current behind the forward end of the diver and thus will not be driven rearwardly by the water current. The dive will continue until the depth reached by the diver will cause the pole line 38 to pull up on the forward end and level out the dive.

With reference to FIG. 4, when a fish strikes, the pull on the fish line will reverse the direction of the diver from end to end and the pull on the pole line is thus rearwardly relative to the diver. This will pull the ring member 26 out from under the finger 30 of the loop 32 and a straight or direct pull is provided between the pole line and the fish. The diver is thus neutralized for diving functions and will not substantially hinder bringing in the fish. At the same time it will resist fighting action of the fish.

The diver is sufficiently buoyant as to raise itself and the bait or lure to the surface. Since the rearward end 16 of the body portion 10 comprises the principal buoyant portion, the diver will assume the position of FIG. 5 when tension is released on the pole line 38. Thus, the diver will ascend to the surface when the pole line is released. When the diver assumes this upright position, wherein the rearward end 16 points upward, a quick jerk on the line will release the ring member 26 from the forward connector 32 and again the diver will be neutralized, whereby it can be pulled easily to the surface at a fast rate.

FIG. 6 illustrates a connector 28' which takes the place of the diverging portions 28 of the flexible link 24. Such connector comprises a triangular plate attached to the side connectors 36 by means of links 46 and connected at its apex to the flexible link 24. Connector plate 28' serves the same function as the diverging portions 28 in that it stabilizes the rearward end of the diver in its diving movement. Such connector plate also eliminates any possibility of tangling of portions of the flexible link.

It is to be understood that the forms of my invention herein shown and described are to be taken as preferred examples of the same and that various changes in the shape, size and arrangement of parts may be resorted to without departing from the spirit of my invention or the scope of the subjoined claims.

Having thus described my invention, I claim:

1. A fishing diver comprising:
   a body portion having forward and rearward ends, top and bottom surfaces, and opposite sides,
   flexible link means having forward and rearward ends,
   pole line connecting means between the ends of said flexible link means,
   fish line connecting means at the forward end of said body portion,
   first connector means on the top surface of said body portion adjacent the forward end thereof,
   and second connector means on the top surface of said body portion adjacent the rearward end thereof,
   said second connector means including a pair of connecting points adjacent opposite sides of said body portion,
   said flexible link means providing a diving function when the diver is subjected to a water current that applies a tension to a fish line connected to said fish line connecting means,
   said flexible link means including a single link portion attached at the forward end thereof to said first connector means and diverging portions secured at the rearward end thereof to said second connector means,
   said diverging portions stabilizing the rearward portion of the diver when subjected to said water current.

2. The fishing diver of claim 1 wherein said first connector means comprises a friction connection and said flexible link means is arranged to release from said body portion when a force is exerted on the forward end of said body portion in a direction opposite from the tension force in the fish line, whereby in such released condition a straight line pull is provided between said pole line connecting means and said second connector means.

3. The fishing diver of claim 2 wherein said body portion is buoyant and will rise to the surface when it is not subjected to water current.

4. The fishing diver of claim 2 wherein the rearward end of said body portion is buoyant and said body portion will rise to the surface with said rearward end pointed upwardly when said body portion is not subjected to water current.

5. The fishing diver of claim 2 wherein said friction connection comprises a spring clip having a friction release opening that faces rearwardly.

6. The fishing diver of claim 2 wherein the rearward end of said body portion is buoyant and said body portion will stand upright in the water with its rearward end pointed upwardly when tension is released from the fish line, said friction connection comprising a spring clip having a friction release opening that faces rearwardly, said flexible link means being releasable from said first connector means in said upright position of said body portion by means of a quick jerk on the pull line.

7. The fishing diver of claim 1 wherein said body portion comprises substantially a wedge shape as viewed from the side with the reduced end being disposed toward the front.

8. The fishing diver of claim 1 wherein said body portion comprises substantially a wedge shape as viewed from the side with the reduced end being disposed toward the front, said body portion having a pointed front end and side wing portions intermediate the forward and rearward ends and leading into a narrowed tapered rearward end.

* * * * *